US011528533B2

(12) United States Patent
Sen

(10) Patent No.: US 11,528,533 B2
(45) Date of Patent: Dec. 13, 2022

(54) DYNAMIC MEDIA CONTENT RUNTIME MODIFICATION

(71) Applicant: Rovi Guides, Inc., San Jose, CA (US)

(72) Inventor: Susanto Sen, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/064,223

(22) Filed: Oct. 6, 2020

(65) Prior Publication Data

US 2022/0109917 A1   Apr. 7, 2022

(51) Int. Cl.
  *H04N 21/41* (2011.01)
  *H04N 21/45* (2011.01)
  *H04N 21/47* (2011.01)
  *H04N 21/472* (2011.01)
  *H04N 21/81* (2011.01)
  *H04N 21/845* (2011.01)
  *H04N 21/8549* (2011.01)

(52) U.S. Cl.
  CPC ......... *H04N 21/47* (2013.01); *H04N 21/4532* (2013.01); *H04N 21/812* (2013.01); *H04N 21/8456* (2013.01)

(58) Field of Classification Search
None
See application file for complete search history.

(56) References Cited

U.S. PATENT DOCUMENTS

| 10,254,946 | B2 * | 4/2019 | Gossweiler, III | ........................... |
| | | | | H04N 21/26283 |
| 2012/0189273 | A1 * | 7/2012 | Folgner | .............. H04N 21/2187 |
| | | | | 386/241 |
| 2016/0247535 | A1 * | 8/2016 | Latulipe | ................ G11B 27/036 |
| 2016/0373817 | A1 * | 12/2016 | Drake | .............. H04N 21/25891 |
| 2019/0191218 | A1 * | 6/2019 | Cormican | .......... H04N 21/4722 |

* cited by examiner

*Primary Examiner* — Hsiungfei Peng
(74) *Attorney, Agent, or Firm* — Haley Guiliano LLP

(57) ABSTRACT

Systems and methods for modifying runtimes of media assets are disclosed. A first input is received indicating a request to modify a current runtime of a media asset being generated for display on a media device. The media asset includes segments. A second input is received and based on the second input, a shortened version of the media asset having a shortened runtime is generated. One or more segments of the media asset are removed from the media asset to generate the shortened version and the shortened version of the media asset is generated for display on the media device.

6 Claims, 8 Drawing Sheets

DYNAMIC MEDIA CONTENT RUNTIME MODIFICATION

BACKGROUND

The present disclosure relates to media content streaming and, more particularly, to systems and methods related to media content runtime management techniques.

SUMMARY

Rapid technological advancements are double-edged, catapulting human efficiency and progress while imposing greater time constraints attributable at least in part to greater productivity expectations. Accordingly, time is valued with an increasing price tag even when spent on leisurely activities such as media content streaming.

Arranging for time to participate in enjoyable, non-work-related activities like media content streaming, in a user's daily schedule, is no longer an easy feat. Multi-tasked daily activities cause time constraints making for uninterrupted time for media asset consumption precious. Interruptions during media content viewing can be frustrating to a media content consumer and not always aligned with on-demand media asset consumption, or shown at a clock time convenient to the consumer to modify the media asset to fit a viewing time within the consumer's schedule. The consumer does not always have the time to watch an entire runtime worth of streamed media content even when the media content to-be-consumed is of notable consumer interest. Moreover, a missed media content scene—a media asset segment—or a sequence of scenes of a streamed media content requires playback and oftentimes even time-consuming playback advancement or rewind to locate the precise place in the media content runtime before the start of a missed segment. In a shared media content consumption setting, missing a segment of the media content by a group consumer (e.g., a kitchen run) while other group members continue to consume the streamed media content inconveniences the latter in having to tolerate re-consumption of missed media content. Understandably, neither the group members who might have missed a segment or two of the media content nor the remainder of the group who have already devoted the time to viewing the segments missed by others may be interested in watching an entire runtime worth of missed segments. Streamed media consumption stands to benefit from greater user convenience, flexibility in use, and efficient consciousness.

In various disclosed embodiments herein, streamed media content consumption is made efficient, convenient, with greater user flexibility. The user enjoys a shortened and time-conscious consumption experience of a selected media content by a simple screen touch, a gesture, or other detected haptic or even non-haptic user movements. A displayed seek bar is telling of the user media content selection, reflecting the media content runtime variance in response to a user display screen touch movement. In some embodiments, a media content segment is displayed on the display screen according to a ranking system based on one or more factors, for example, a user profile or other criterion, as discussed below. User scheduled events may be graphically displayed on or in the vicinity of the seek bar for comparison with user media content segment selections to generate a shortened media content runtime.

As noted above, the media content may be shortened (or summarized) by evaluating segments of the media content based on one or more variables. For example, each segment of the media content may be ranked based on one or more of the variables and the rankings may be accumulated for use in media content segment selection. Based on the segment rankings and in some cases in addition to other criteria, segments may be eliminated from consumer viewing. In some cases, the segment with the lowest ranking may be eliminated. For example, where the size of a particular segment is larger than a user-selected runtime, the segment may be eliminated. In some cases, segments are compared for runtime based on a ranking. Continuing with the above example, the next segment (a segment of least interest to the user) may be selected for comparison of its runtime with the user-selected runtime and if the segment runtime is determined to exceed the user-selected runtime, the next lowest ranked segment is selected for comparison and so on until a segment with a runtime shorter than the user-selected runtime (a shortened media content) is determined for consumer display. In some cases, a shortened media content may be facilitated in alternative or additional manners, such as by use of a compression technique to remove redundant or unnecessary media data from the media content to reduce the media content runtime.

In some embodiments, a current time is reflected graphically above a first user contact point, for example, on a display screen of a media device to display a user contact (or touch) input. When the contact point is moved in a particular direction, effectively reflecting a dynamic user runtime selection, the estimated current runtime is displayed in the vicinity of (e.g., above or below) the first contact point based on the user runtime selection. The display screen of the media device may be caused to show the summarized media content at the estimated local time.

In accordance with various embodiments, a method of modifying runtimes of media assets is disclosed. A first input is received indicating a request to modify a current runtime of a media asset for display on a media device. The media asset includes media content segments. A second input is received, and one or more segments of the media asset are removed to generate a shortened version of the media asset. The shortened version of the media asset has a shortened runtime and is generated for display on the display screen of the media device.

The first input may indicate the request to modify the current runtime of the media asset and may include two touch (or gesture) inputs on the display screen of the media device. The two touch inputs may include a first touch input indicating a start time of the media asset and a second touch input indicating an end time of the media asset. The second input generates a shortened version of the media asset and includes a swipe of one of the first or second touch inputs to a new media content viewing start or end time. The system may adjust the start and end time in accordance with the current user location local time.

In some cases, the two touch inputs are received simultaneously, and, in some cases, the two touch inputs are received at different times. For example, the first and second touch inputs may be received simultaneously where the media asset is displayed on a smaller size display screen of a media device and the first and second touch inputs may be received at different times where the media asset is displayed on a larger size display screen of a media device, one that poses a challenge for two widely displaced contact points for fingers of a human hand to reach at the same time.

As earlier noted, in some cases, a dynamic media seek bar is generated for display on the display screen of the media device. In response to the first input, one or more reference time points are generated for display on the media seek bar based on a schedule of a user conveniently enabling the media content viewing time to fit into a user daily schedule.

In some embodiments, in response to the second input, the shortened runtime may be automatically determined based on a user schedule or a user profile. The second input may include receiving a selection of a reference time point and may indicate a desired runtime. Each of the media asset segments may include a level of importance, a ranking, and a media content segment may be identified based on the lowest level of importance. The identified segment is removed to generate a modified version of the media asset. A determination may be made as to whether the modified version of the media asset has a runtime greater than the desired runtime and in response to determining that the runtime of the modified version of the media asset is not greater than the desired runtime, the shortened version of the media asset may be based on the modified version of the media asset. In some embodiments, the level of importance of each of the segments is determined based on a user profile.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is, in some embodiments, directed to methods and systems for media asset runtime modification, and more particularly to techniques for generating for display a shortened version of a media asset based on certain user action.

Figure 1:
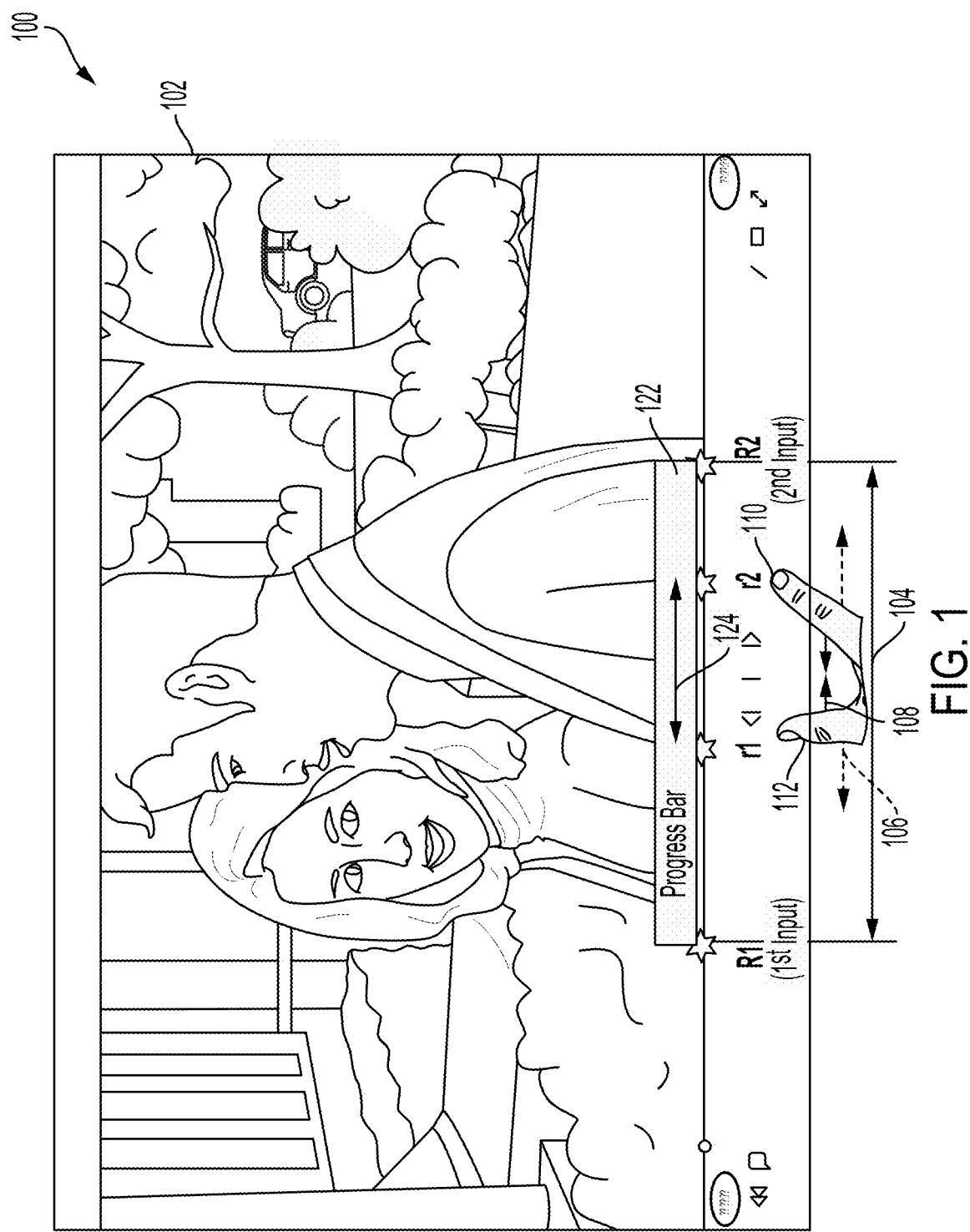
FIG. 1 shows an illustrative diagram of a media asset runtime modification system, in accordance with some embodiments of the disclosure.

FIG. 1 shows an illustrative diagram of an exemplary media asset runtime modification system, in accordance with some embodiments of the disclosure. In some embodiments, the media asset runtime modification system performs generating for display a shortened version of a media asset displayed to a user. The system is triggered to generate the shortened version of a media asset based on certain user action.

In an embodiment of the disclosure, as shown in FIG. 1, a media asset runtime modification system 100 is shown to include a media device 102 for generating for display a media asset or a shortened version of the media asset. In some embodiments, media device 102 includes a display screen typically incorporated, in whole or in part, in the media device, such as without limitation a handheld device, a smartphone, or a tablet. Additional examples of a media device are listed with reference to FIG. 8 herein. The display screen of media device 102 may be alternatively or additionally coupled to the media device. For example, the media device may perform various processing functions and then direct an externally situated display screen, through a graphics interface, to display the processed media asset to a user of the media device. In some embodiments, media device 102 may process the media asset, such as the movie shown played by the media device, by shortening the media asset runtime in accordance with various disclosed embodiments herein.

With continued reference to FIG. 1, media device 102 receives a first input, R1, indicating a request to modify a current runtime of the media asset displayed by media device 102, such as the movie shown in FIG. 1. The media asset may include several media asset segments. Media device 102 receives a second input, R2. In some embodiments, each of inputs R1 and R2 may be received from a user of media device 102 on a touch display of media device 102 in the form of haptic movement or gesture, for example, a user screen touch or a user gesture. Input R1 may trigger a request to media device 102 for a shortened version of the media asset and input R2 may trigger media device 102 to generate the shortened version of the media asset. Media device 102 may then generate for display the shortened version of the media asset on a display screen of media device 102 or on a display screen physically externally located relative and communicatively coupled to media device 102, as discussed above. The location of the shortened version of the media asset may be a user selectable feature, for example, the shortened version of the media asset may be a portion in the middle or near the end of the media asset, as selected by the user.

In some embodiments, R1 may be a first input and R2 may be a second input and the location or position of R2 on a display screen of the media device may indicate the (shortened) runtime of the shortened version of the media asset. In some embodiments, R1 and R2 may collectively be the first input and r1 and r2 may collectively be the second input (e.g., after a user swiping R1 and R2 to the display screen positions of r1 and r2, respectively.) Yet in some embodiments, r1 and r2 may collectively be the first input and the position on a display screen of the media device to which r1 and r2 are swiped may collectively be the second input. In still some embodiments, R1 may be the first input and r1 and r2 may collectively be the second input (e.g., each of r1 and r2 being a single (e.g., simultaneous) touch point on the display screen.) The start and stop times of the shortened version of the media asset displaying on the display screen may be indicated by one or a combination of R1, R2, r1, and r2. For example, the start time of the shortened version of the media asset may be represented by R1 or r1 and in some cases, R2 or r2. Similarly, the stop time of the shortened version of the media asset may be represented by R2 or r2 and in some cases, R1 or r1. In some embodiments, input r1 is effectively the start time of the shortened version of the media asset and input r2 is effectively the end or stop time of the shortened version of the media asset displaying on the display screen. In some embodiments, input R1 is effectively the start time of the shortened version of the media asset and input R2 is effectively the end or stop time of the shortened version of the media asset displaying on the display screen. In some embodiments, either R1 or r1 is effectively the stop time of the shortened version of the media asset. Each of the two inputs, i.e., the first input and the second input, may include a first touch input, r1, indicating a start time of the media asset and a second touch input, r2, indicating an end time of the media asset. In some embodiments, the second input, r2, may trigger generating a shortened version of the media asset. Either the first input, r1, or the second input, r2, may be a swipe to a new start or end time, respectively. The first touch input and the second touch input may be received simultaneously or at different times. For example, a user may make contact with two distinct points of the media device screen using two distinct user fingers at about the same time to indicate the start and end times of the shortened version of the media asset. Alternatively, or additionally, the user may make contact with two distinct points of the media device using two distinct fingers at two distinct times to indicate the start and end times of the selected shortened version of the media asset. In some embodiments, in response to the second input, as described above, media device 102 automatically determines a runtime 124 of the shortened version of the media asset based on one or more of a user schedule or a user profile.

Touch inputs r1 and r2, may be facilitated by user haptic movements such as with two human finger touches on the display screen of media device 102, as shown at the bottom of the screen of media device 102 in FIG. 1. For example, a detected user thumb touch on the display screen, touch input r1, may serve as a request to media device 102 for a summarized media asset and a detected user index finger touch on the display screen, touch input r2, may cause media device 102 to generate the summarized media asset with the shortened runtime 124 of the media asset. The shortened runtime may be defined by the distance between r1 and r2. Inputs R1, R2, r1, and r2 need not be screen touch inputs and may instead be other forms of input to media device 102, for example, a hand or finger wave on the display or a button depressed on a remote control device in wireless or with wired communication with media device 102. In some embodiments, in response to the second input, R2, media device 102 automatically determines the shortened runtime 124 (a desired runtime) based on one or more of a schedule of a user or a user profile, as further discussed below relative to FIG. 3.

In some embodiments, media device 102 generates for display a media progress bar 122 simultaneously with the depiction of the media asset for ease of summarized media asset selection. For example, progress bar 122 may assist the user with a visual comparison of the runtime 124 of the shortened version of the media asset relative to the total media asset runtime. Further, the location of the summarized media asset within the media asset may be more pronounced via progress bar 124. For example, runtime 124 of shortened version of the media asset, defined by the distance between inputs r1 and r2, may be displayed by progress bar 122 simultaneously with the displaying of the media asset to aid the user in dynamic selection of the shortened version of the media asset, as further described below.

To generate the shortened version of the media asset, media device 102 may select a media asset segment based on a level of importance. For example, and without limitation, the level of importance of a media asset segment may be identified by a segment of the media asset with the lowest level of importance. Other criteria may form the basis of the media asset segment selection, such as a user profile. For example, user preferences in a social media user profile may indicate a user dislike (a thumb down icon) of a particular actor that may cause media device 102 to flag the scenes as unimportant or candidates for removal. Next, media device 102 removes the identified segment to generate the modified version of the media asset and determines whether the modified version of the media asset has a runtime greater than the user desired runtime. In response to determining that the runtime of the modified version of the media asset is not greater than the desired runtime, media device 102 generates for display the shortened version of the media asset.

In embodiments with a user thumb touch and a user index finger touch, serving as inputs on the display screen of media device 102, a user media asset summary selection may be indicated, such as shown in the embodiment of FIG. 1. A first touch input, r1, may be caused by a user thumb 112 touch on the screen of the media device and a second touch input, r2, may be caused by a user index finger 110 touch on the screen of the media device. Movement of the user index finger relative to the user thumb, or vice versa, on the media device screen may be indicative of a user-desired media asset summary. But before the final media asset summary selection is made, the user may adjust the distance between r1 and r2, the shortened media asset runtime, to determine a final desirable runtime, such as runtime 124 in FIG. 1. In some embodiments, the user dragging or swiping the user thumb and index finger away from each other while continuing to make contact with the media device screen using both fingers, in a distancing 106 direction, increases the media asset summary runtime 124 whereas the user dragging or swiping the user thumb and the user index finger toward each other while continuing to make contact with the media device screen using both fingers, in a closing 108 direction, decreases the media asset summary runtime 124. Further, the locations of r1 and r2 relative to the media asset displayed on the media device screen may be indicative of the location in the media asset from which the shortened version of the media asset is to be generated. For example, the horizontal length of progress bar 122 may indicate the total media asset runtime 104 and the location of the selected shortened version of the media asset within progress bar 122 may indicate the location of the selected shortened version of the media asset within the media asset (e.g., middle of the media asset.)

Figure 2:
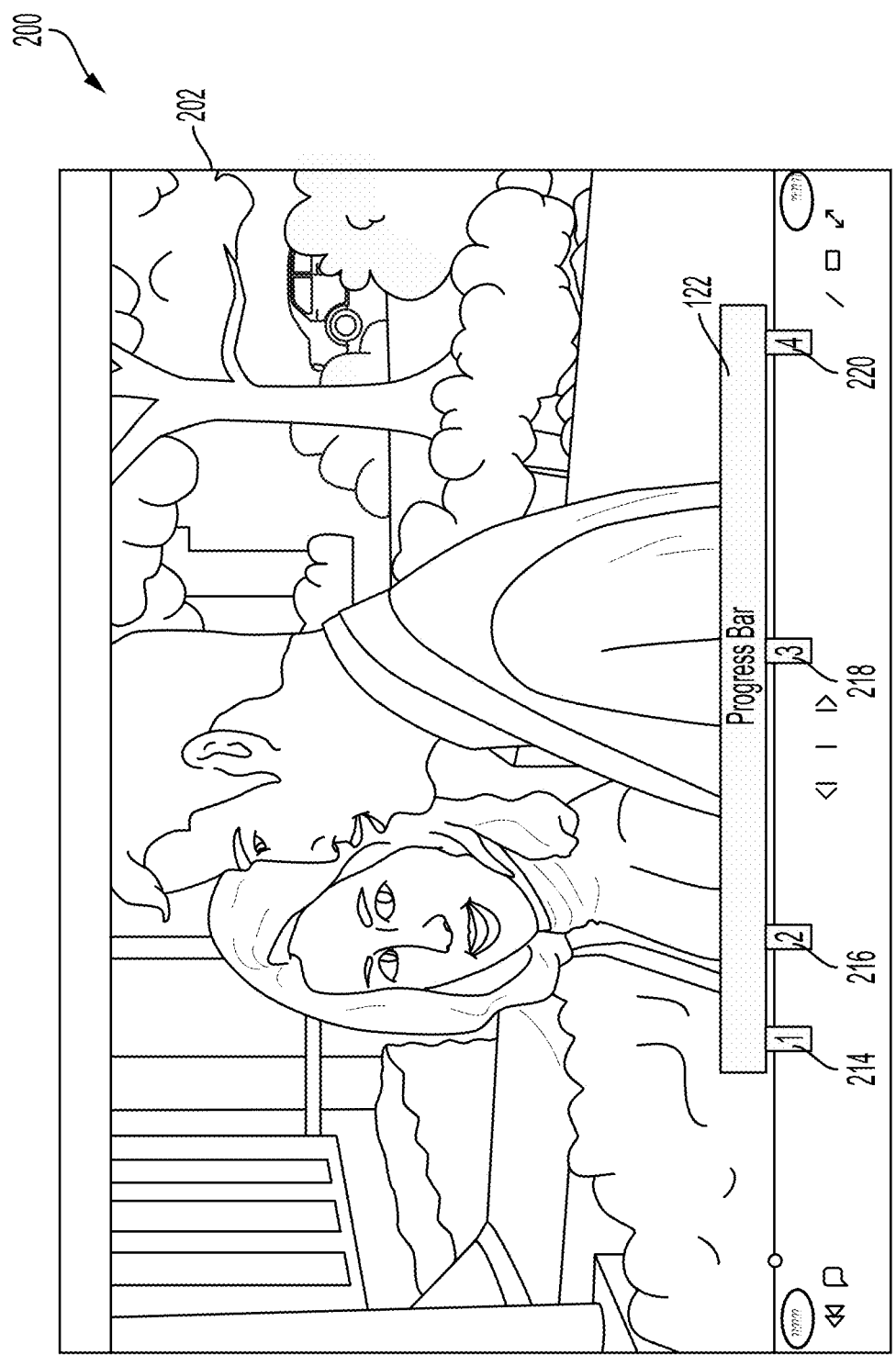
FIG. 2 shows an illustrative diagram of a media asset runtime modification system, in accordance with some embodiments of the disclosure.

In some embodiments, in response to the first input, R1, one or more reference time points on the media progress bar 122 may be generated for display on a display screen based on a schedule of the user. Receipt of the second input, R2, is indicative of receiving a selected reference time point among the displayed reference time points. In an embodiment of the disclosure, as shown in FIG. 2, a media asset runtime modification system 200 is shown to include a media device 202 for generating for display a media asset. In some embodiments, system 200 is configured as system 100. In the interest of brevity, features and functions of system 200 that are in common with system 100 are not repeated herein. Media device 202 is shown to display, on a display screen, four distinct reference time points, 1-4, labeled 214-220, respectively. While four reference time points are shown in FIG. 2 and discussed herein, it is understood that a different number of reference time points may be displayed on the display screen. As noted above, the reference time points 214-220 are displayed in response to the first input, R1, and each reference time point is a distinct point in time pursuant to a user schedule or a user profile. One or more of the reference time points 214-220 may be shown on, above, or below a progress bar 222 for ease of dynamic scheduling of start and end times of a shortened version of the media asset being displayed on the display screen of media device 202, as further discussed relative to FIG. 3 below.

Each reference time point may be taken from a user calendar, a user social media profile, or a combination thereof, and represents a point in time when a user of media device 202 is scheduled to perform a certain task or an event involving the user may be due to occur. For instance, reference time point 214 may be taken from a user daily calendar and denotes a time when the user is due to report to or start work for the day; reference time point 216 may be taken from the user social media profile, preferences, or schedule event, such as a scheduled group activity involving the user; reference time point 218 may be taken from the user calendar, denoting a time when the user is due to return from or stop work for the day; and reference time point 220 may be also taken from the user calendar, denoting a time when the user is expecting guests to arrive at home.

Figure 3:
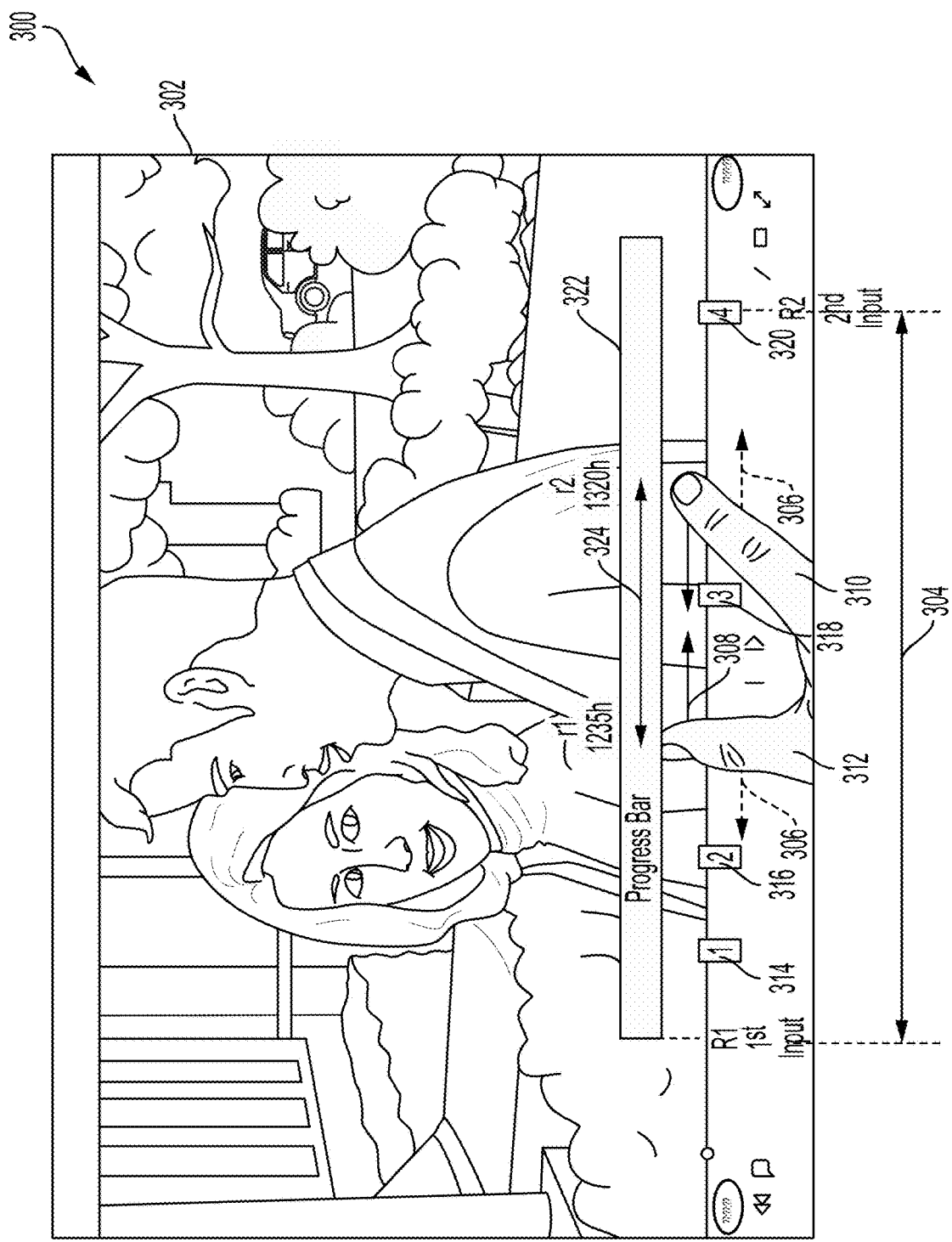
FIG. 3 shows an illustrative diagram of a media asset runtime modification system, in accordance with some embodiments of the disclosure.

In some embodiments, one or more of the reference time points is based on a schedule of a user. In an embodiment of the disclosure, as shown in FIG. 3, a media asset runtime modification system 300 is shown to include a media device 302 for generating for display a media asset. In some embodiments, system 300 is configured as systems 100 and 200. In the interest of brevity, features and functions of system 300 that are in common with systems 100 and 200 are not repeated herein. Media device 302 is shown to display, on a display screen, four distinct reference time points, 1-4, labeled 314-320, respectively. While four reference time points are shown in FIG. 3 and discussed herein, it is understood that a different number of reference time points may be displayed on the display screen. Reference time points 314-320 may be displayed in response to a first input, R1. Each reference time point is a distinct point in time pursuant to a user schedule or a user profile. One or more of the reference time points 314-320 may be shown on, above, or below a progress bar 322 for ease of dynamic scheduling of start and end times of a shortened version of a media asset being displayed on the display screen of media device 302, such as shown in FIG. 3.

As earlier discussed, media device 302 may generate for display, in response to a first input, such as R1 or a first touch input, such as r1, one or more reference time points on a media progress bar 322 based on a schedule of a user. In some embodiments, receiving a second input, R2, may include receiving a selection from the reference time points 314-320. For example, a user selection of reference time point 320 may represent receiving the second input, R2. The selection of any other of the reference time points 314-318 may alternatively indicate receipt of the second input, R2.

As in the embodiment of FIG. 1, in embodiments with a user thumb touch and a user index finger touch, serving as inputs on the display screen of media device 302, a user media asset summary selection may be indicated, such as shown in the embodiment of FIG. 3. A first touch input, r1, may be caused by a user thumb 312 touch on the screen of the media device and a second touch input, r2, may be caused by a user index finger 310 touch on the screen of the media device. Movement of the user index finger relative to the user thumb, or vice versa, on the media device screen may be indicative of a user-desired media asset summary. Before the final media asset summary selection is made, the user may adjust the distance between r1 and r2, the shortened media asset runtime, to determine a final desirable runtime, such as runtime 324 in FIG. 3. In some embodiments, the user dragging or swiping the user thumb and index finger away from each other while continuing to make contact with the media device screen using both fingers, in a distancing 306 direction, increases the media asset summary runtime 324 whereas the user dragging or swiping the user thumb and the user index finger toward each other while continuing to make contact with the media device screen using both fingers, in a closing 308 direction, decreases the media asset summary runtime 324. The locations of r1 and r2 relative to the media asset displayed on the media device screen may be indicative of the location in the media asset from which the shortened version of the media asset is to be generated. For example, the horizontal length of progress bar 322 may indicate the total media asset runtime 304 and the location of the selected shortened version of the media asset within progress bar 322 may indicate the location of the selected shortened version of the media asset within the media asset (e.g., middle of the media asset.)

In some embodiments, in response to the second input, R2, the shortened runtime is automatically determined based on one or more of a schedule of a user or a user profile. For example, in response to selection of reference time point 320, the shortened runtime (of a shortened version of the media asset displayed by media device 302) may be automatically determined. Reference time point 320 may be automatically taken from a user calendar and may represent a scheduled time for when the user expects a house guest. Accordingly, the system may automatically self-adjust, setting the end time of the shortened version of the media asset for a naturally convenient time, immediately or a predetermined number of minutes before the house guest is due to arrive, a user programmable feature.

As with FIG. 1, the shortened version of the media asset is generated for display by eliminating segments based on certain criterion, such as the level of importance of the segments and whether the modified version of the media asset has a runtime greater than a user desired runtime. System 300, as with systems 100 and 200, may automatically adjust the start and end times of the shortened version of the media asset to a time local to the user, a user selectable feature. Additionally, the time may be programmably set as military or non-military time. For example, in FIG. 3, the start time and end time are set to user local military times of 12:35 and 13:20, respectively.

Figure 4:
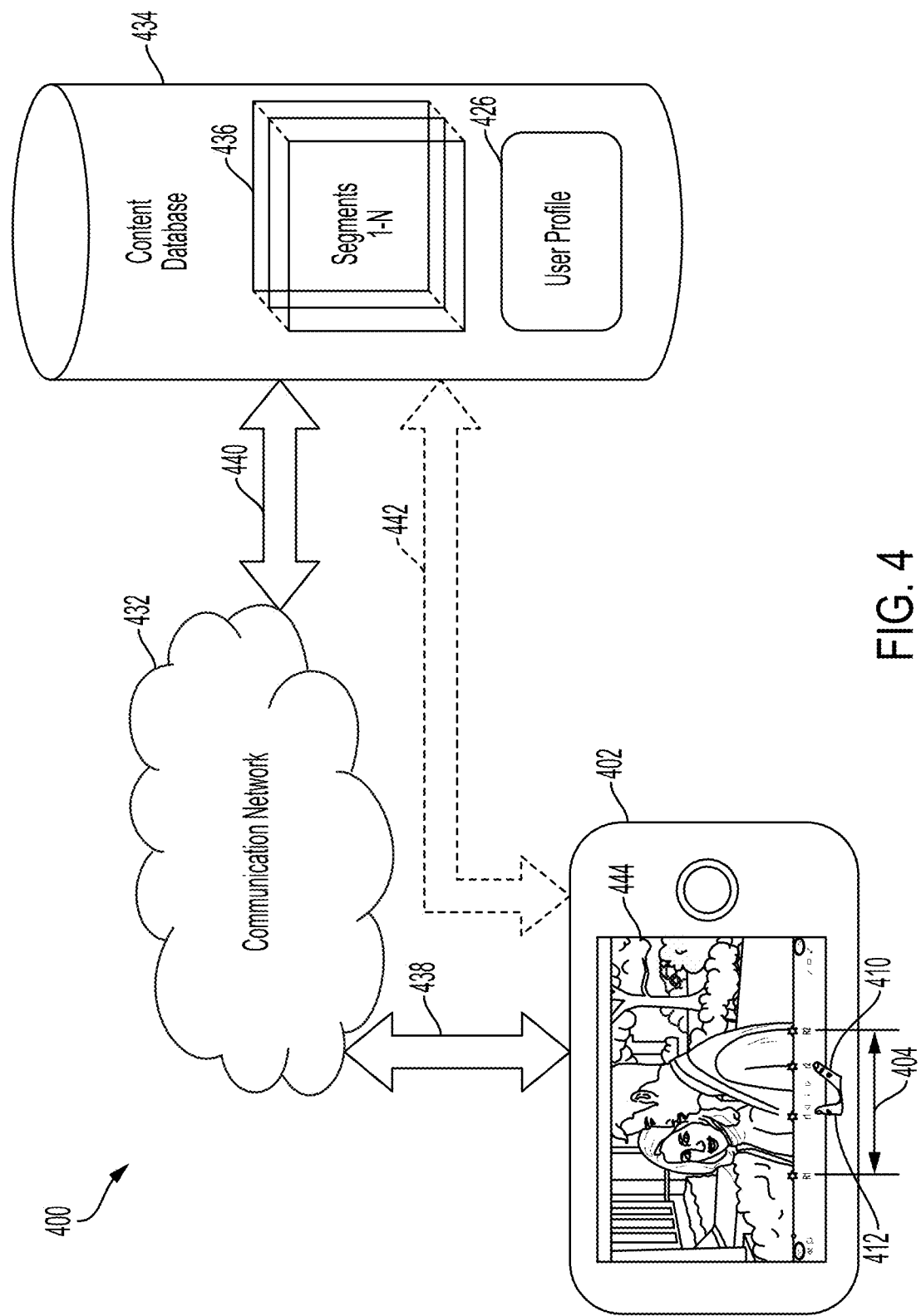
FIG. 4 shows an illustrative diagram of a media asset runtime modification system, in accordance with some embodiments of the disclosure.

The media asset runtime modification systems of various embodiments may include a remote or local connection between a media device displaying the media asset and a content database maintaining segments of the media asset to be shortened. In an embodiment of the disclosure, as shown in FIG. 4, a media asset runtime modification system 400 is shown to include a media device 402 for generating for display a media asset, a communication network 432 for facilitating remote communication, and a content database 434 for storing segments of the media asset displayed by media device 402. In some embodiments, media device 402 may be configured as media devices 100, 200, and 300 of FIGS. 1, 2, and 3, respectively. For example, media device 402 may display a media asset on a display screen 444, the movie shown in FIGS. 1-3, while accepting a first input, R1, that may include two touch inputs, r1 and r2, and a second input R2, as described above relative to FIGS. 1-3. The total media asset runtime may be defined by the distance between R1 and R2 as runtime 404 and selection of the start and stop times of a shortened version of the media asset may be performed by movement of a user thumb 412 and a user index finger 410, respectively.

In FIG. 4, database 434 may be communicatively coupled to media device 402 through communication network 432. Specifically, media device 402 is shown communicatively coupled through interface 438 to communication network 432 and communication network 432 is shown communicatively coupled through interface 440 to database 434 for facilitating the exchange of media asset segments 436 for processing by media device 402, as previously discussed relative to FIGS. 1-3. Alternatively, or additionally, media device 402 and database 434 may be coupled directly, wirelessly or with wire, and in the absence of communication network 432, through interface 442. Database 434 and communication network 432 may be communicatively coupled wirelessly or with wire. In some embodiments, system 400 does not include database 434. In such an embodiment, the relevant functions of database 434 may be performed, at least in part, by media device 402 or a combination of media device 402 and communication network 432. In an example implementation, database 434 may be a physically local storage device or storage space that is in part or in whole incorporated into system 400.

In some embodiments, such as shown in the embodiment of FIG. 4, database 434 is organized into storage spaces for housing N number of segments 436 ("N" being an integer value) and perhaps other media content-related information. Database 434 may additionally house one or more user profile items in user profile 426 section. User profile items may include user-favorite media content items, for example, based on historical user selections, such as a specific actor, and/or other user-specific information, such as user calendared events. The user profile section of database 434 may further house machine learned media content selections/preferences. For example, a media content preference model may be trained with input representing past user selections and the output of the trained model may serve as input to the media device process as though a user input is received. In some cases, the user profile section and the segments section of database 434 may reside in more than one distinct database structure. In this type of configuration, communication network 432 and media device 402 may both be communicatively coupled to each of the structurally distinct databases using interfaces analogous to those shown and discussed relative to the embodiment of FIG. 4

In some embodiments and without limitation, database 434 may comprise one or more flat, hierarchical, relational or network types of databases. In some embodiments, database 434 may be, in part or in whole, incorporated in or coupled to a server, a networking device, such as the server illustrated and discussed relative to FIG. 8 herein. Database 434 may be any storage type of device configurable to effectively house media asset segments and user profile for facilitating media asset management, as discussed relative to various embodiments of the disclosure herein. In some embodiments, media device 402 is equipped to communicate with an application programming interface (API) designed to communicate with the server to effect media content management actions. For example, system 400 may store program code that when executed by a processor of, coupled to, or accessed by system 400 causes certain media content management functions, such as segment elimination to be performed by the server. In some embodiments, the server may be located internally or externally to a network cloud. For example, the server may be a part of communication network 432 or externally located and communicatively coupled to communication network 432.

Figure 5:
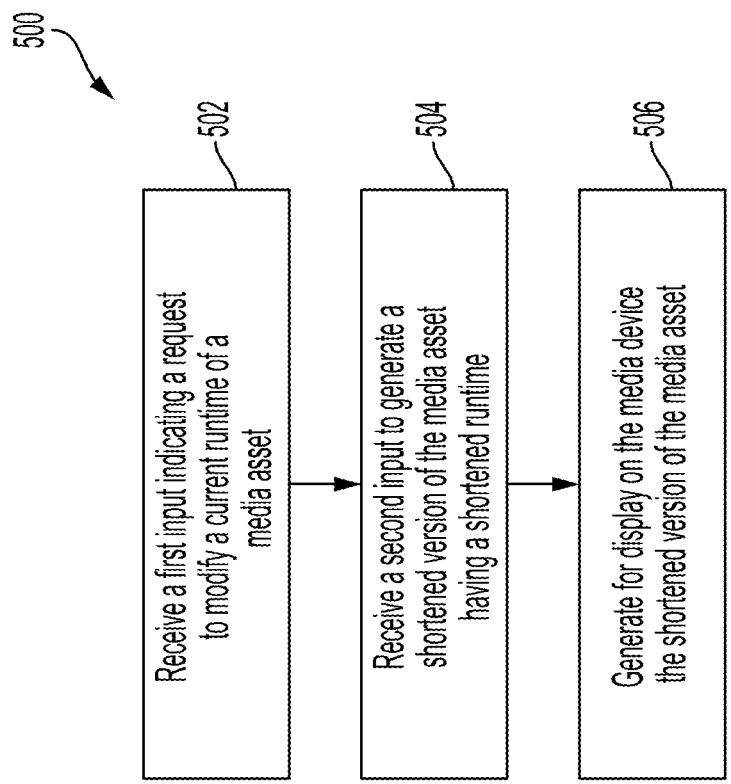
FIGS. 5-7 each depict an illustrative flowchart of a media asset runtime modification process, in accordance with some embodiments of the disclosure.
Figure 6:
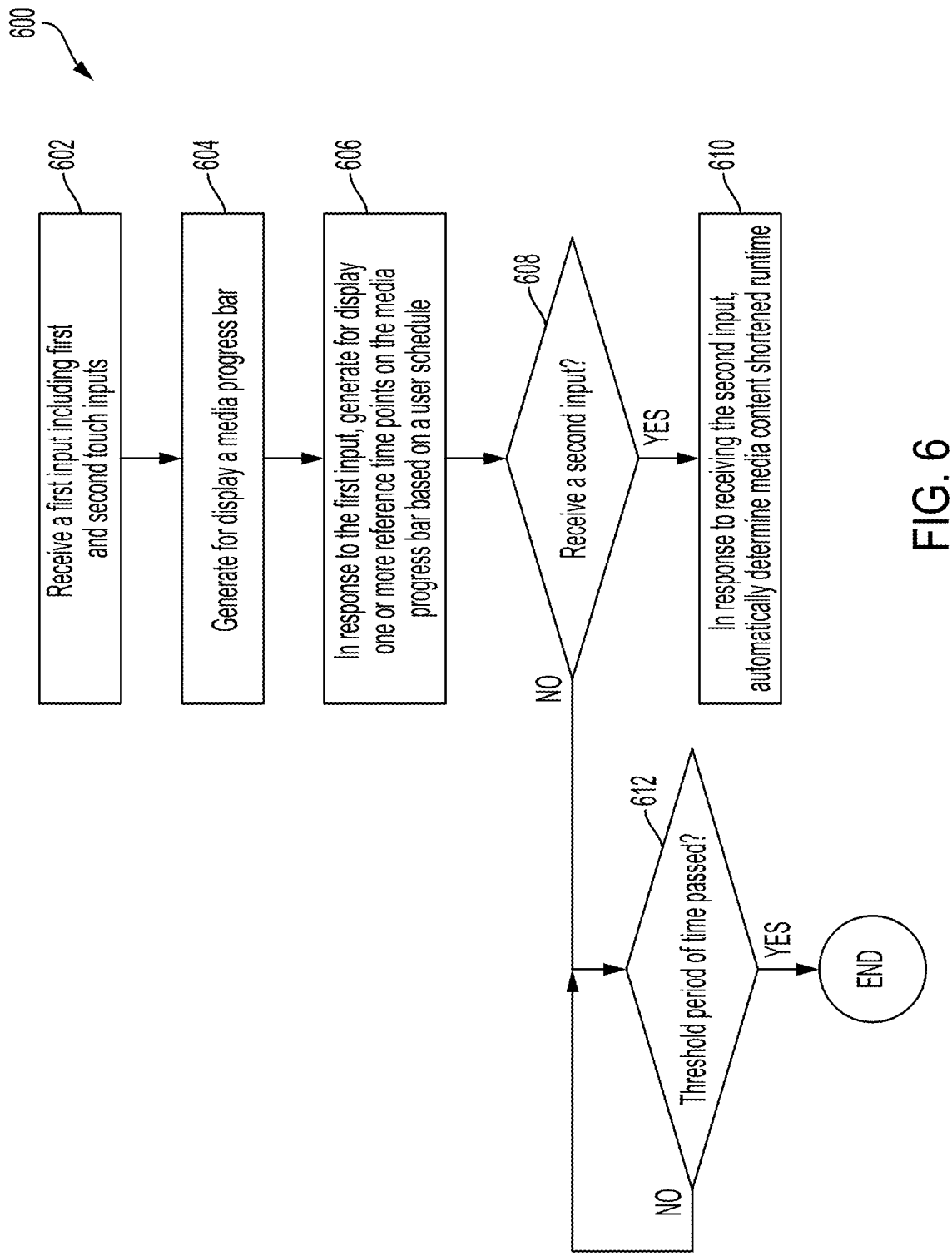
Figure 7:
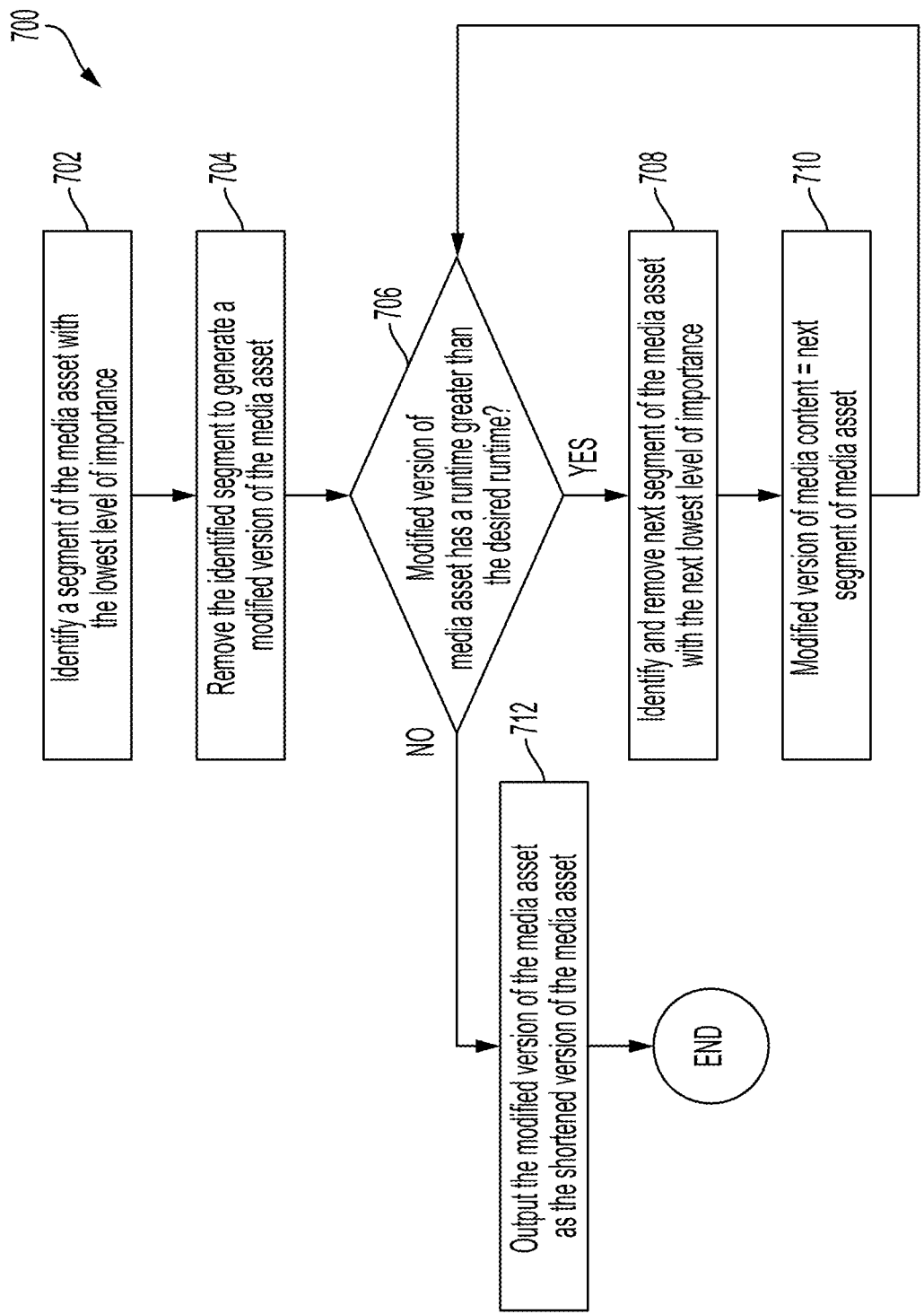

FIGS. 5-7 each depict an illustrative flowchart of a media asset runtime modification process, in accordance with some embodiments of the disclosure. In FIG. 5, a flowchart of a media asset runtime modification process 500 is shown in accordance with disclosed methods and embodiments. In a nonlimiting example, process 500 comprises relevant steps performed by a system implementing the embodiments of FIGS. 1-4. For the purpose of clarity, process 500 is hereinafter described relative to media device 102 of FIG. 1.

At step 502, media device 102 receives a first input, such as input R1, which includes a request to modify a current runtime of a media asset currently displaying on a display screen of media device 102. The media asset includes media asset segments. Input R1 with the request to modify the runtime of the media asset may be received in various optional manners. For example, as earlier noted, input R1 may be a touch input on the display screen of media asset 102 indicative of a request when received at a designated area of the display screen or when the touch input is detected for a minimum threshold period of time. Input R1 may be generated from a click or depression of a particular button of a remote control device communicatively coupled to media device 102. Input R1 may be any input recognizable by media device 102 for facilitating the request to modify the media asset runtime.

At step 504, a second input, such as input R2, is received by media device 102 that triggers the generation of a shortened version of the media asset displaying on the display screen of media asset 102. The shortened version of the media asset has a shortened runtime relative to the total runtime of the media asset. For example, the total runtime of the media asset may be 2 hours whereas the shortened runtime may be 15 minutes. At step 506, media device 102 generates for display on the display screen of media device 102 the shortened version of the media asset.

In FIG. 6, a flowchart of a media asset runtime modification process 600 is shown in accordance with disclosed methods and embodiments. In a nonlimiting example, process 600 comprises relevant steps performed by a system implementing the embodiments of FIGS. 1-4. For the purpose of clarity, process 600 is hereinafter described relative to media device 302 of FIG. 3.

At step 602, media device 302 receives a first input, such as input R1, which may be a first touch input, r1, and a second input, which may be a second touch input, r2. In some embodiments, input R1 and R2 may be in a manner as described relative to the input R1 of FIG. 5. Each of the touch inputs r1 and r2 may be as described above relative to the embodiments of FIGS. 1-3. In some embodiments, the first touch input r1 may be unnecessary and input R1 includes touch input r2 exclusively in which case, the start time may be equated to a time represented by the input R1. For example, assuming input R1 is a touch input, media device 302 may set the start time of the shortened version of the media asset to the current time, a time after detecting the input R1.

At step 604, media device 302 generates for display on its display screen a media progress bar, such as progress bar 322. In some embodiments, media device 302 displays the progress bar when or shortly after it starts to display the media asset in which case step 604 may precede step 602. At step 606, in response to receiving the first input, for example touch input r1, media device 302 generates for display one or more reference time points, for example, reference time points 314-320, on or in the vicinity of progress bar 322. As earlier discussed, reference time points 314-320 may be based on the schedule of a user of media device 302.

At step 608, media device 302 waits for a second input, such as touch input r2, and in response to receiving the second touch input, media device 302 proceeds to step 610. In some embodiments, touch input r2 is as described above relative to the embodiments of FIGS. 1-3. Media device 302 may wait a threshold time period for receiving the second touch input and if media device 302 fails to receive the second touch input during the threshold time period, media device 302 may time-out, ending process 600. In this case, a shortened version of the media asset is not generated. At step 610, in response to receiving the second input, the shortened media asset stop time, media device 302 automatically determines the shortened runtime of the shortened version of the media asset it is currently displaying. For example, the second input may be a reference time point, such as without limitation, one of the reference time points 214-220 or 314-320 in FIG. 2 and FIG. 3, respectively. Another example of the second input may be input r2.

In FIG. 7, a flowchart of a media asset runtime modification process 700 is shown in accordance with disclosed methods and embodiments. In a nonlimiting example, process 700 comprises relevant steps performed by a system implementing the embodiments of FIGS. 1-4. For the purpose of clarity, process 700 is hereinafter described relative to the embodiments of FIGS. 1 and 4.

At step 702, media device 102 identifies a segment of a media asset being generated for display on the display screen of media device 102. For example, media device 102 may retrieve a media asset segment from segments 436 (FIG. 4) of database 434 or media device 102 may retrieve the media asset segment from a local memory. The segment at step 702 may be identified based on a history of consumption of the media asset being displayed. For example, media device 102 may save certain user preferences in a user profile, such as user profile 426, in database 434 of user disliked scenes based on a user viewing history or based on a manual preference entry. At step 704, media device 102 removes the identified segment from the media asset to generate a modified version of the media asset. Media device 102 may remove more than one media asset segment in which case media device 102 may repeat performing step 702 for each identified segment until all segments to be identified are identified.

At step 706, media device 102 compares the runtime of the modified version of the media asset of step 704 to a desired runtime. The desired runtime may be selectable and programmable. For example, media device 102 may store a user-selected desired runtime in the user preferences (of user profile 426) in database 434 or the desired runtime may be received as a desired runtime input, from the user, in real-time. At step 706, media device 102 determines to perform step 708 or step 712 based on the outcome of the comparison. In response to media device 102 determining the runtime of the modified version of the media asset is greater than the desired runtime, media device 102 performs step 708 and in response to media asset 102 determining the runtime of the modified version of the media asset is less than the desired runtime, media device 102 performs step 712.

At step 712, media device 102 generates (outputs) the modified version of the media asset as the shortened version of the media asset. At step 708, media device 102 identifies the next segment of the media asset, analogously to identifying a segment at step 702. That is, the identification of the next segment at step 708 may be based on the next lowest level of importance. The level of importance may be based on a user preference as earlier discussed. At step 710, the modified version of the media asset is set equal to the next segment of the media asset of step 710 (the modified version of the media asset of step 706 is effectively removed and replaced with the next segment of the media segment from step 708) and process 700 repeats from step 706. Media device repeats steps 706-710 until a modified version of the media asset with a runtime smaller than the desired runtime is determined at step 706 and process 700 proceeds to step 712.

The order of steps of each of the processes 400-700, as shown in the flowcharts of FIGS. 4-7, respectively, may be suitably changed or exchanged. One or more steps, as may be suitable, can be added to or deleted from each of the processes 400-700.

Figure 8:
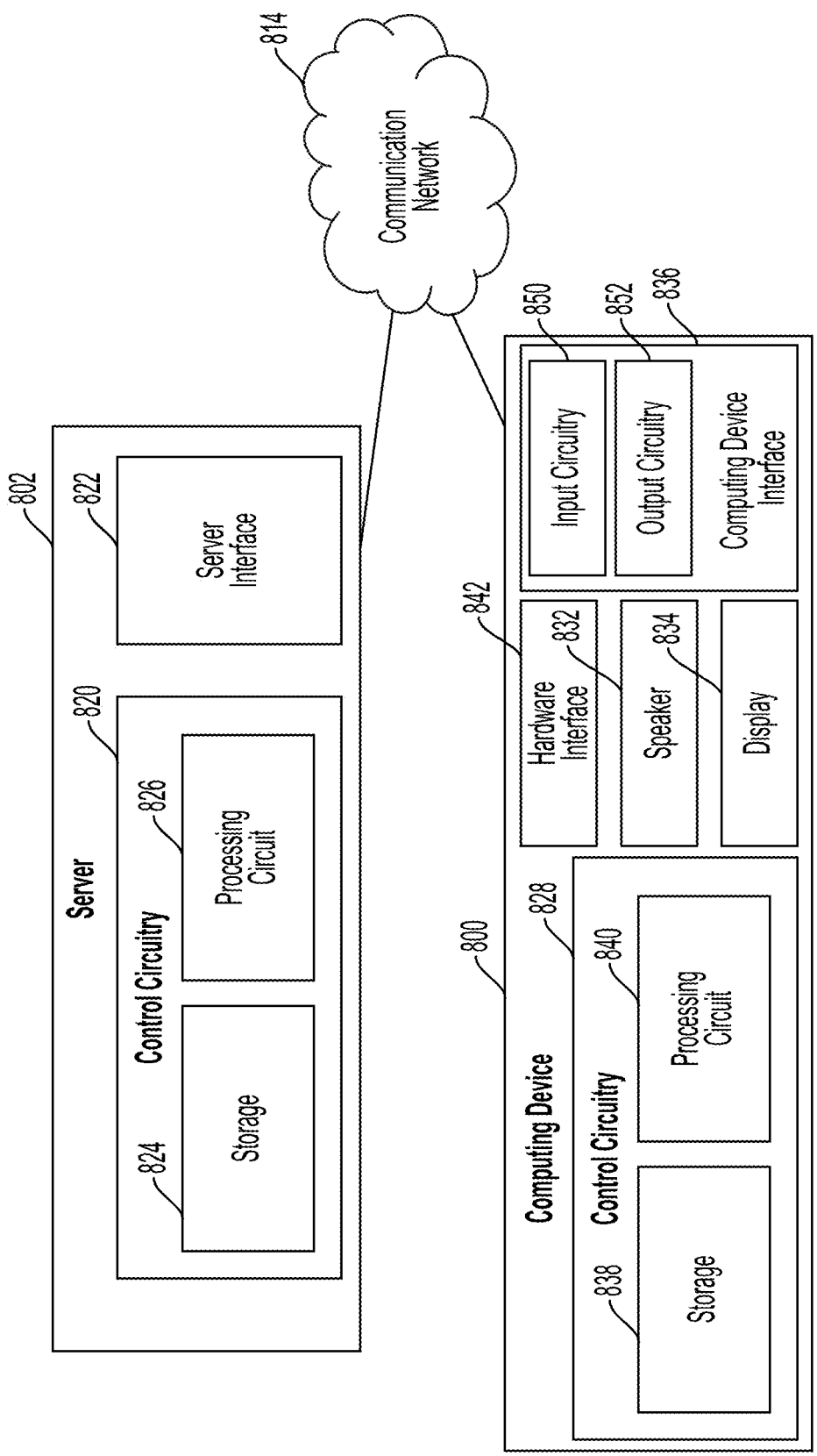
FIG. 8 is a block diagram of an illustrative system for performing media asset runtime modification processes, in accordance with some embodiments of the present disclosure.

A user device may access, process, transmit and receive signals, in addition to other features, for example to carry out the functions and implementations shown and described herein, with one or more media devices (i.e., user equipment or user devices) such as the generalized embodiments of an illustrative user device. FIG. 8 is a block diagram of illustrative system 800 for modifying a media asset runtime, in accordance with some embodiments of the present disclosure. In system 800, there may be more than one of each type of user device, but only one of each is shown in FIG. 8 to avoid overcomplicating the drawing. In addition, each user may utilize more than one type of user device and more than one of each type of user device.

In the embodiment of FIG. 8, a server 802 is shown communicatively coupled to a communication network 814. Further, a computing device 800 is shown communicatively coupled to server 802 through communication network 814. Alternatively, or additionally, computing device 800 and server 802 may be directly communicatively coupled, bypassing communication network 814.

In some embodiments, server 802 is, in part or in whole, incorporated in communication network 814. In some embodiments, communication network 814 is configured as communication network 432 of FIG. 4.

In some embodiments, computing device 800 may be configured, in whole or in part, as a media device. In some embodiments, computing device 800 may include any user electronic device that performs media asset shortening or modification operations as disclosed herein. In some embodiments, user device 800 may incorporate, in part or in whole, or is communicatively coupled to, each of media devices 102, 202, 302, or 402 of FIGS. 1-4, respectively. As referred to herein, the phrase "user equipment device," "user equipment," "user device," "electronic device," "electronic equipment," "media equipment device," or "media device" should be understood to mean any device for processing the text string described above or accessing content, such as, without limitation, a desktop computer, a tablet, a laptop, a remote server, any other suitable device, or any combination thereof, for speech detection and recognition processing, as described above, or accessing content, such as, without limitation, wearable devices with projected image reflection capability, such as a head-mounted display (HMD) (e.g., optical head-mounted display (OHMD)); electronic devices with computer vision features, such as augmented reality (AR); virtual reality (VR); extended reality (XR); or mixed reality (MR); portable hub computing packs; a television; a Smart TV; a set-top box; an integrated receiver decoder (IRD) for handling satellite television; a digital storage device; a digital media receiver (DMR); a digital media adapter (DMA); a streaming media device, a DVD player; a DVD recorder; a connected DVD; a local media server; a BLU-RAY player; a BLU-RAY recorder; a personal computer (PC); a laptop computer; a tablet computer; a WebTV box; a personal computer television (PC/TV); a PC media server; a PC media center; a handheld computer; a stationary telephone; a personal digital assistant (PDA); a mobile telephone; a portable video player; a portable music player;

a portable gaming machine; a smartphone; or any other television equipment; computing equipment; or wireless device; and/or combination of the same. In some embodiments, the user device may have a front-facing screen and a rear-facing screen, multiple front screens, or multiple angled screens. In some embodiments, the user device may have a front-facing camera and/or a rear-facing camera. On these user devices, users may be able to navigate among and locate the same content available through a television. Consequently, a user interface in accordance with the present disclosure may be available on these devices, as well. The user interface may be for content available only through a television, for content available only through one or more of other types of user devices, or for content both available through a television and one or more of the other types of user devices. The user interfaces described herein may be provided as online applications (i.e., provided on a website), or as stand-alone applications or clients on user equipment devices. Various devices and platforms that may implement the present disclosure are described in more detail below.

Computing device 800 is shown to generally include control circuitry 828, hardware interface 842, speaker 832, display 834, and computing device interface 836. In some embodiments, display 834 is configured as or analogous to, in whole or in part, media devices 102, 202, 302, or 402 of FIGS. 1-4, respectively. Control circuitry 828 is shown to include storage 838 and processing circuitry 840. Computing device interface 836 is shown to include input circuitry 850 and output circuitry 852. It is understood that computing device 800 may include additional or fewer components than that which are shown in FIG. 8.

In some embodiments, display 834 (or display screen 834) may include a touchscreen, a television display or a computer display. In a practical example, display 834 may display a media asset or a shortened version of media asset, as processed by devices 102, 202, 302, or 402. Display 834 may further display a media progress bar, for example progress bars 122, 222, or 322 of FIGS. 1, 2, and 3, respectively, and reference time points, such as reference time points 214-220 or 314-320 of FIGS. 2 and 3, respectively.

In some embodiments, computing device 800 is part of a system along with a server 802 and a communication network 814. It is understood that while a single instance of a component may be shown and described relative to FIG. 8, additional instances of the component may be employed. For example, server 802 may include, or may be incorporated in, more than one server. Similarly, communication network 814 may include, or may be incorporated in, more than one communication network. Server 802 is shown communicatively coupled to computing device 800 through communication network 814. While not shown in FIG. 8, as noted above, server 802 may be directly communicatively coupled to computing device 800, for example, in a system absent or bypassing communication network 814.

Communication network 814 may comprise one or more network systems, such as, without limitation, an Internet, LAN, WIFI or other network systems suitable for audio processing applications. In some embodiments, the system of FIG. 8 excludes server 802, and functionality that would otherwise be implemented by server 802 is instead implemented by other components of the system, such as one or more components of communication network 814. In still other embodiments, server 802 works in conjunction with one or more components of communication network 814 to implement certain functionality described herein in a distributed or cooperative manner. Similarly, in some embodiments, the system may exclude computing device 800, and functionality that would otherwise be implemented by computing device 800 is instead implemented by other components of the system, such as one or more components of communication network 800 or server 802 or a combination thereof. In still other embodiments, computing device 800 works in conjunction with one or more components of communication network 814 or server 802 to implement certain functionality described herein in a distributed or cooperative manner.

Server 802 includes control circuitry 820 comprising processing circuitry 826 and storage 824. Each of storages 824 and 838 may be an electronic storage device. Each storage 824, 838 may be used to store various types of content, metadata, and or other types of data. Non-volatile memory may also be used (e.g., to launch a boot-up routine and other instructions). Cloud-based storage may be used to supplement storages 824, 838 or instead of storages 824, 838. In some embodiments, control circuitry 820 and/or 828 executes instructions for an application stored in memory (e.g., storage 824 and/or storage 838). Specifically, control circuitry 820 and/or 828 may be instructed by the application to perform the functions discussed herein. In some implementations, any action performed by control circuitry 820 and/or 828 may be based on instructions received from the application. For example, the application may be implemented as software or a set of executable instructions that may be stored in storage 824 and/or 838 and executed by control circuitry 820 and/or 828. In some embodiments, the application may be a client/server application where only a client application resides on computing device 800, and a server application resides on server 802.

The application may be implemented using any suitable architecture. For example, it may be a stand-alone application wholly implemented on computing device 800. In such an approach, instructions for the application are stored locally (e.g., in storage 838), and data for use by the application is downloaded on a periodic basis (e.g., from an out-of-band feed, from an Internet resource, or using another suitable approach). Control circuitry 828 may retrieve instructions for the application from storage 838 and process the instructions to perform the functionality described herein. Based on the processed instructions, control circuitry 828 may, for example, perform processes 500-700 of FIGS. 5-7, respectively, in response to input received from input circuitry 850, which in turn receives input from a user, or from communication network 814. For example, in response to receiving an input R1 or R2 or a touch input r1 or r2, processing circuit 840 of control circuitry 828 may perform the steps of processes 400-700 or processes relative to various embodiments, such as the example of FIGS. 1-4, by executing program code stored in storage 838.

In client/server-based embodiments, control circuitry 828 may include communication circuitry suitable for communicating with an application server (e.g., server 802) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 814). In another example of a client/server-based application, control circuitry 828 implements a web browser that interprets web pages provided by a remote server (e.g., server 802). For example, the remote server may store the instructions for the application in a storage device. The remote server may process the stored instructions using circuitry (e.g., control circuitry 828) and/or generate displays. Computing device 800 may receive the displays generated by the remote server and may display the content of the displays locally via display 834. This way, the processing of the instructions is performed remotely (e.g., by server 802) while the resulting displays, such as the display windows described elsewhere herein, are provided locally on computing device 800. Computing device 800 may receive inputs from the user via input circuitry 850 and transmit those inputs to the remote server for processing and generating the corresponding displays. Alternatively, computing device 800 may receive inputs from the user via input circuitry 850 and process and display the received inputs locally, by control circuitry 828 and display 834, respectively.

Server 802 and computing device 800 may transmit and receive content and data such as media content data, representing a media asset, media asset segments, a modified version of a media asset, or a shortened version of the media asset, via communication network 814. For example, server 802 may be configured as a media content processor, and computing device 800 may be configured as a media content device to transmit media content data in media content files to and receive media content files from server 802. In some embodiments, server 802 may be configured as a server communicatively coupled to media devices 102, 202, 302, and 402 of FIGS. 1-4, respectively, as described earlier relative to these figures. Control circuitry 820 may send and receive commands, requests, and other suitable data through communication network 814 using server interface 822. In some embodiments, server 802 is configured, in part or in whole, as a media content management processor of media devices 102, 202, 302, or 402 of FIGS. 1-4, respectively. Control circuitry 820, 828 may communicate directly with each other using interfaces 822, 836, respectively, avoiding communication network 814.

In some embodiments, processing circuitry 840, control circuitry 828, or a combination thereof, may implement one or more of the processes in media devices 102, 202, 302, or 402 of FIGS. 1-4, respectively. In some embodiments, the processing circuitry, control circuitry, or a combination thereof, may implement one or more functions or components of the media devices of FIGS. 1-4, such as devices 102, 202, 302, and 402.

Control circuitry 820 and/or 828 may be based on any suitable processing circuitry such as processing circuitry 826 and/or 840, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 820 and/or control circuitry 828 are configured to implement a media asset management system, such as systems 100, 200, 300, or 400 of FIGS. 1-4, respectively, or parts thereof, that perform various media content runtime processing, user input processing, display functions, media content data reception and operation processes described and shown in connection with FIGS. 1-7.

Computing device 800 receives a user input at input circuitry 850. For example, computing device 800 may receive text data and user input, as previously discussed. Computing device 800 transmits data through output circuitry 852. For example, computing device 800 may transmit audio data through output circuitry 852. In some embodiments, computing device 800 is a user device (or player) configured as devices 102, 202, 303, or 402 of FIGS. 1-4, respectively, with the capability to receive media content segments, media content, shortened version of a media content, modified version of a media asset, user input, or a combination thereof. It is understood that computing device 800 is not limited to the embodiments and methods shown and described herein.

In some embodiments, input circuitry 850 and output circuitry 852 may be configured as a part of or coupled to a media device, such as the media devices of FIGS. 1-4. In some embodiments, input circuitry 850 may be a receiver for receiving user input, as discussed relative to FIGS. 1-7. Output circuitry 852 may be configured to output media content data. Transmission of a user input or media content data to computing device 800 may be accomplished using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 5G, Li-Fi, LTE, or any other suitable wireless transmission protocol. Transmission of data, for example in the form of media content data, may be accomplished through output circuitry 852 to communication network 814, or server 802 using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 5G, Li-Fi, LTE, or any other suitable wireless transmission protocol.

Processing circuitry 840 may receive input from input circuitry 850. Processing circuitry 840 may convert or translate the received user input, which may be in the form of a haptic movement, a touch or a gesture, to digital signals. In some embodiments, input circuitry 850 performs the translation to digital signals. In some embodiments, processing circuitry 840 (or processing circuitry 826, as the case may be) carry out disclosed processes and methods. For example, processing circuitry 840 or processing circuitry 826 may perform processes 500-700 of FIGS. 5-7, respectively.

In some embodiments, display 834 is caused by generation of a display by devices 102, 202, 302, and 402 of FIGS. 1-4, respectively, or user devices coupled to devices 102, 202, 302, and 402. A user or processor, such as processors of media devices 102, 202, 302, and 402 (of FIGS. 1-4, respectively) may send instructions to control circuitry 828 using input circuitry 850. Input circuitry 850, display 834, or both may include a touchscreen configured to provide a display and receive haptic input. For example, the touchscreen may be configured to receive haptic input from a finger, a stylus, or both. In some embodiments, computing device 800 may include a front-facing screen and a rear-facing screen, multiple front screens, or multiple angled screens. In some embodiments, input circuitry 850 includes a remote-control device having one or more microphones, buttons, keypads, any other components configured to receive user input, or combinations thereof. For example, input circuitry 850 may include a handheld remote-control device having an alphanumeric keypad and option buttons.

Speaker 832 may be provided as integrated with other elements of user device 800 or may be a stand-alone unit. The audio component of videos and other content displayed on display 834 may be played through speaker 832. In some embodiments, the audio may be distributed to a receiver (not shown), which processes and outputs the audio via speaker 832. In some embodiments, for example, control circuitry 828 is configured to provide audio cues to a user, or other audio feedback to a user, using speaker 832. In some embodiments, the audio receiver of computing device 800 may be a microphone configured to receive audio input such as voice utterances or speech. For example, a user may speak letters or words that are received by the microphone and converted to text by control circuitry 828. In a further example, a user may voice commands that are received by the microphone and recognized by control circuitry 828.

An application may be implemented using any suitable architecture. For example, a stand-alone application may be wholly implemented on computing device 800. In some such embodiments, instructions for the application are stored locally (e.g., in storage 838), and data for use by the application is downloaded on a periodic basis (e.g., from an out-of-band feed, from an Internet resource, or using another suitable approach). Control circuitry 828 may retrieve instructions of the application from storage 838 and process the instructions to generate any of the displays discussed herein. Based on the processed instructions, control circuitry 828 may determine what action to perform when input is received from input circuitry 850. For example, a screen highlighted word by detection of a double-click on a displayed word may be indicated by the processed instructions when input circuitry 850 indicates that a word was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of modifying runtimes of media assets, comprising:
   receiving a first input indicating a request to modify a current runtime of a media asset being generated for display on a media device, wherein the media asset comprises a plurality of segments and each of the plurality of segments comprises a level of importance, and wherein the first input comprises two touch inputs received simultaneously or at about the same time;
   generating for display a media progress bar;
   generating for display, in response to the first input, one or more reference time points on the media progress bar based on a schedule of a user;
   receiving a second input to generate a shortened version of the media asset having a shortened runtime, wherein the second input comprises a selection of the one or more reference time points on the media progress bar and indicates a desired runtime, and wherein one or more segments of the media asset are removed to generate the shortened version based on the selection of the one or more reference time points;
   identifying a segment of the media asset having a lowest level of importance;
   removing the identified segment to generate a modified version of the media asset;
   determining whether the modified version of the media asset has a runtime greater than the desired runtime;
   in response to determining that the runtime of the modified version of the media asset is not greater than the desired runtime, generating the shortened version of the media asset based on the modified version of the media asset; and
   generating for display on the media device the shortened version of the media asset.

2. The method of claim 1, further comprising determining the level of importance of each of the plurality of segments based on a user profile.

3. A system for modifying runtimes of media assets comprising:
   processing circuitry configured to:
      receive a first input indicating a request to modify a current runtime of a media asset being generated for display on a media device, wherein the media asset comprises a plurality of segments and each of the plurality of segments comprises a level of importance, and wherein the first input comprises two touch inputs received simultaneously or at about the same time;
      generate for display a media seek bar;
      generate for display, in response to the first input, one or more reference time points on the media seek bar based on a schedule of a user;
      receive a second input to generate a shortened version of the media asset having a shortened runtime, wherein the second input comprises a selection of the one or more reference time points on the media progress bar and indicates a desired runtime, and wherein one or more segments of the media asset are removed to generate the shortened version based on the selection of the one or more reference time points;
      identify a segment of the media asset having a lowest level of importance;
      removing the identified segment to generate a modified version of the media asset;
      determine whether the modified version of the media asset has a runtime greater than the desired runtime; and
      in response to determining that the runtime of the modified version of the media asset is not greater than the desired runtime, generate the shortened version of the media asset based on the modified version of the media asset; and generate for display on the media device the shortened version of the media asset.

4. The system of claim 3, wherein the processing circuitry is further configured to determine the level of importance of each of the plurality of segments based on a user profile.

5. A method of modifying runtimes of media assets, comprising:

receiving a first input indicating a request to modify a current runtime of a media asset being generated for display on a media device, wherein the media asset comprises a plurality of segments, and wherein the first input comprises two touch inputs received simultaneously or at about the same time;

generating for display a media progress bar;

generating for display, in response to the first input, one or more reference time points on the media progress bar based on a schedule of a user;

receiving a second input to generate a shortened version of the media asset having a shortened runtime, wherein the second input comprises a selection of the one or more reference time points on the media progress bar, and wherein one or more segments of the media asset are removed to generate the shortened version based on the selection of the one or more reference time points; and generating for display on the media device the shortened version of the media asset;

wherein the user dragging or swiping the two touch inputs away from each other while continuing to make contact with a screen in a distancing direction increases the shortened runtime of the shortened version of the media asset, and wherein the user dragging or swiping the two touch inputs toward each other while continuing to make contact with the screen in a closing direction decreases the shortened runtime of the shortened version of the media asset.

6. A system for modifying runtimes of media assets comprising:

processing circuitry configured to:

receive a first input indicating a request to modify a current runtime of a media asset being generated for display on a media device, wherein the media asset comprises a plurality of segments, and wherein the first input comprises two touch inputs received simultaneously or at about the same time;

generate for display a media seek bar;

generate for display, in response to the first input, one or more reference time points on the media seek bar based on a schedule of a user;

receive a second input to generate a shortened version of the media asset having a shortened runtime, wherein the second input comprises a selection of the one or more reference time points on the media progress bar, and wherein one or more segments of the media asset are removed to generate the shortened version based on the selection of the one or more reference time points; and generate for display on the media device the shortened version of the media asset;

wherein the user dragging or swiping the two touch inputs away from each other while continuing to make contact with a screen in a distancing direction increases the shortened runtime of the shortened version of the media asset, and wherein the user dragging or swiping the two touch inputs toward each other while continuing to make contact with the screen in a closing direction decreases the shortened runtime of the shortened version of the media asset.

* * * * *